United States Patent [19]

Leloux

[11] 4,449,910
[45] May 22, 1984

[54] APPARATUS FOR MAKING PROFILED PLASTIC TUBE

[75] Inventor: Arnoldus W. J. Leloux, Dedemsvaart, Netherlands

[73] Assignee: Wavin B.V., Zwolle, Netherlands

[21] Appl. No.: 386,280

[22] Filed: Jun. 8, 1982

[30] Foreign Application Priority Data

Jun. 15, 1981 [NL] Netherlands .................... 8102869
Jul. 8, 1981 [NL] Netherlands .................... 8103254

[51] Int. Cl.³ .............................................. B29C 17/07
[52] U.S. Cl. .................................... 425/325; 264/508;
264/566; 425/336; 425/337; 425/370; 425/396
[58] Field of Search .............. 425/326, 387.1, 539,
425/336–337, 370, 372, 396; 264/508, 566

[56] References Cited

U.S. PATENT DOCUMENTS

| | | | |
|---|---|---|---|
| 1,041,439 | 10/1912 | Dearborn | 425/DIG. 108 |
| 2,514,801 | 7/1950 | Sapp | 425/370 |
| 3,349,156 | 10/1967 | Zieg | 264/508 |
| 3,544,665 | 12/1970 | Bowers | 264/174 |
| 3,744,952 | 7/1973 | Bequet et al. | 425/336 |
| 3,751,541 | 8/1973 | Hegler | 425/370 |
| 3,776,679 | 12/1973 | Hegler | 425/396 |
| 3,792,952 | 2/1974 | Hamon | 425/370 |
| 4,021,178 | 5/1977 | Braun | 425/326.1 |
| 4,212,618 | 7/1980 | Hegler et al. | 425/326.1 |
| 4,381,276 | 4/1983 | Hegler et al. | 425/326.1 |

FOREIGN PATENT DOCUMENTS 1280552 12/1961 Fed. Rep. of Germany ...... 425/539

*Primary Examiner*—Jeffery R. Thurlow
*Attorney, Agent, or Firm*—Wilkinson, Mawhinney & Theibault

[57] ABSTRACT

Apparatus for making profiled plastic tube and comprising two circulating endless chains, each making a plurality of mold halves move along with a tube coming from an extruder, these mold halves pairwise constituting a mold cavity in which the tube is being given its profile. According to the invention the molds are movable relative to the chain links in a direction perpendicular to the direction of movement of the links. The machine frame is provided with guides for the mold halves, some located interiorly, others exteriorly, with respect to the chain loop, such that once closed, the cavity formed by the pairs of mold halves will remain closed and undisturbed up to the end.

Preferably the transitions between curved portions and the operative portion of the path of the mold halves at the entrance and the exit ends are bending points of mathematically calculated paths and the operative straight path tangentially joins said transitional portions.

In order to further eliminate vibrations and other disturbances in the regular course of the mold halves, it is preferable that the chains are each provided with driving means which are operative near the entrance end of the operative straight portion of the path, and with braking means which are operative near the exit end thereof.

11 Claims, 9 Drawing Figures

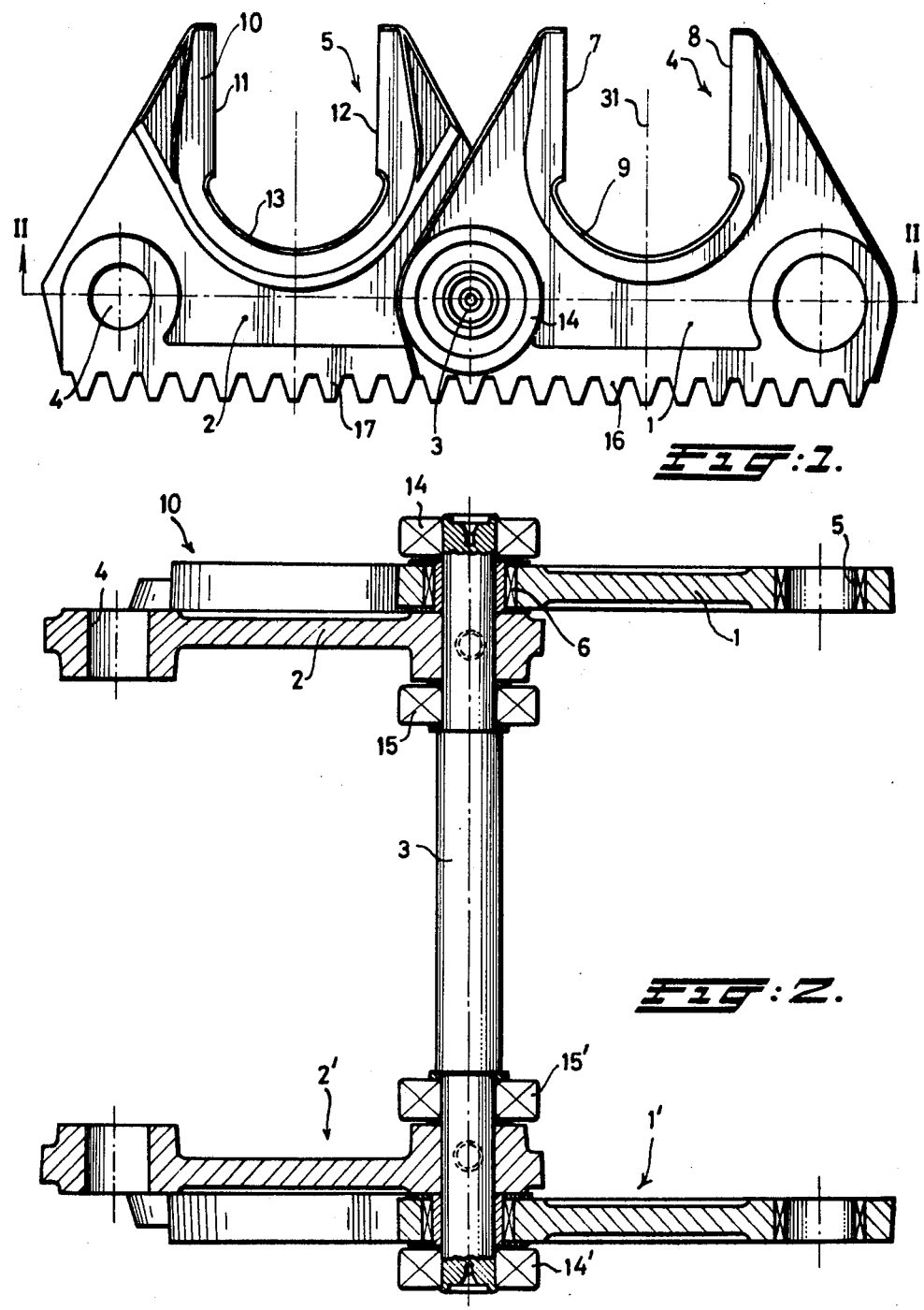

APPARATUS FOR MAKING PROFILED PLASTIC TUBE

BACKGROUND OF THE INVENTION

The present invention relates to an apparatus for making profiled plastic tube by means of an extruder, said apparatus comprising two opposite circulating chains, each making a plurality of mold halves move along with the tube coming from the extruder, these mold halves together constituting, in a rectilinear portion of the paths of said chains, a mold cavity in which the tube is being given its profile.

To the extent that production speeds are being increased, more severe requirements hold for the drive of the chain which supports the mold halves. More particularly, in that case, a perfectly regular course of the series of adjoining mold halves over the effective portion of the path will be necessary. Generally speaking, certain minor irregularities in said course will be caused by play in the links of the drive chain and by irregularities, particularly differences in size, in the individual molds.

In this connection it is important that the cylindrical cavity of molds which, in the common, rectilinear portion of the path is effective to operate upon the tube, is kept undisturbed as good as possible. This is so for the full length of said cavity, but the problem requires particular attention at the beginning and at the end of the path, so at the entrance and the exit ends. Irregularities in the course of the moving molds has, so far, been one limitation on the production speed as far as standards of quality of the product were to be met.

OBJECTS OF THE INVENTION

One object of the invention is to assure that the mold halves, which approach one another when the cylindrical cavity closes, execute a movement which smoothly joins the direction of displacement, or the axis, of the tube to be worked upon.

Another object, closely related to the first, is to assure that, when opening at the end, the mold halves part in lateral direction until the corrugations formed are entirely disengaged, always taking into account the fact that the molds move along with the tube which is being worked upon.

Another object is to increase production speeds, while nevertheless providing an excellent product quality.

Still another object is to improve the regular course of the molds by constantly urging them, in the operative portion of the path, one against the other in longitudinal direction.

SUMMARY OF THE INVENTION

According to the invention, in its basic idea, the molds are movable relative to the chain links in a direction perpendicular to the direction of movement of the links, and the machine frame is provided with guides for the molds, of which at least a guide in the operative rectilinear portion of the path, is located interiorly with respect to the chain loop, and guides in the curved portions of the path are located with respect to the loop.

There is, thus, introduced a laterial shiftability of the molds with respect to the chains, in combination with a forced control.

The relative movability of the molds with respect to the links is preferably realized in this way that the chain links are forked-shaped and that the molds are provided with guide rolls cooperating with parallel inner faces of the forks and provided with guide rolls cooperating with the guides for the molds.

Furthermore, according to the invention, the chains are each provided with driving means which are operative near the entrance end of said operative rectilinear or straight portion of the path, and with braking means which are operative near the exit end thereof.

In this way one obtains that any play between the links of the chain is removed, such play up to now being the most important cause of, or at least possibility for, a relative displacement of the molds. It will be understood that to make all molds accurately identical, and equal to the nominal size of an individual chain link, so that it will be possible to urge the mold halves one against the other without any minor movement whatsoever with respect to one another, resulting in a perfectly regular course.

By "braking means" in connection with the present invention there should generally be understood a device which exerts such a pressure to the drive chain for the molds, or to the molds themselves, in the operative, straight portion of their path, that the chain links, and the molds are urged one against the other in lengthwise direction.

Advantageously, for obtaining such braking action, a system is chosen which does not consume any energy for producing the braking force. This is realized by an embodiment of the apparatus in which the braking means comprise sets of auxiliary toothed wheels, one being mounted on a spindle of a driven toothed wheel at the entrance end, the other one being an idle guiding wheel for the drive chain near the exit end, the former auxiliary wheel being fixedly mounted relative to the main drive wheel and the latter-mentioned auxiliary wheel being rotatable over a certain angular distance relative to the associated main wheel, there being provided sets of springs inbetween the two, and a chain being passed over the set of auxiliary toothed wheels.

In this way a condition of tension in the chain is created which is entirely determined by the force of the springs, independent of the rotation of the whole drive system.

The features of the present invention which are believed to be novel are set forth with particularity in the appended claims.

Said claims and many of the attendant advantages will be more readily appreciated as the same becomes better understood with reference to the following detailed description and considered in connection with the accompanying drawings in which like reference symbols designate like parts throughout the figures.

DESCRIPTION OF THE DRAWINGS

FIG. 1 is a top view of two links of a drive chain for the molds in the best mode of the invention;

FIG. 2 is a cross-sectional view of the set of links according to the arrows II—II of FIG. 1;

DESCRIPTION OF THE PREFERRED EMBODIMENTS

Figure 3:
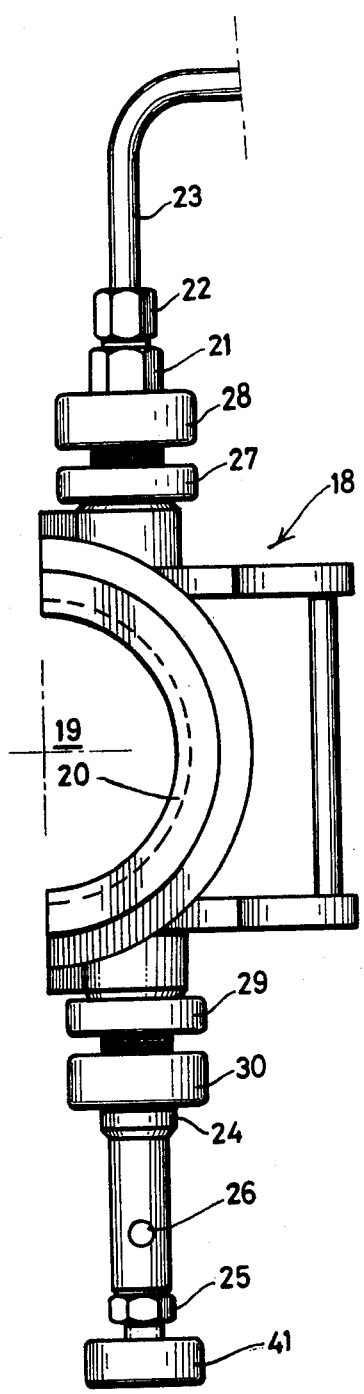
FIG. 3 shows a mold which is apt to cooperate with the links according to FIGS. 1 and 2.

In FIGS. 1 and 2 two representative links 1 and 2 are shown, which are interconnected by means of a pin 3, and which constitute parts of a circulating chain. The whole machine for treatment of tubes comprises two such circulating chains or loops, which carry molds (compare FIG. 4) In FIGS. 1 and 2 for the sake of clarity, only the bores 4 and 5 for connection with the neighboring links are represented, not the neighboring links themselves.

As appears from FIG. 2 the main planes of neighboring links are situated at different heights, so that one partially overlies the other; for this reason link 1 is called an outer link and link 2 an inner link. The movability of the links with respect to one another is obtained in that link 1 is pivotable, by means of a bush, with respect to pin 3, whilst link 2 may be fixedly arranged on said pin.

As appears from the top view of FIG. 1 the links are forkshaped, i.e. a recess is provided, open to one side and constituted by two parallel faces such as 7, 8 interiorly interconnected by a curved portion 9. In the outer link 1, this recess delimited by faces 7-9 is located simply in the main face of the material. But for the inner link the forkshape, generally indicated by 10, has been raised with respect to the main link plane, as appears from FIG. 2. As seen from above, the design is the same as the design of the fork in the outer link, i.e. it consists of two parallel faces 11 and 12, respectively, which are connected by a curved portion 13.

A guide roll 14 is provided on the top end of pin 3, so outside the outer link 1 and a similar guide roll 15 is provided on pin 3 at the inside of the inner link 2. The function of these guide rolls will be further clarified. At the side opposite the forkshape, links 1 and 2 are substantially straight and they are provided there with racks 16, 17. These racks on the outer and inner links are situated in the main plane of the links themselves and are therefore situated at two different levels. They are adapted to drive the chain in its entirety by means of a drive gear 40 (compare FIG. 4) which should have a sufficient axial dimension to cooperate with both the outer and the inner gear teeth 16, 17. In the curved portions of the path the rack portions 16, 17 shift with respect to one another.

As appears from FIG. 2, a similar set of links is provided, entirely symmetrically, at the lower end of pin 3, as generally indicated by 1', 2' with associated guide rolls 14', 15'.

The fork-shaped chain links described are adapted to cooperate with molds such as represented in FIG. 3. A mold 18 is visible here, realized in a known manner, and having a semicircular recess 19. In known manner this mold on one circulating chain, together with a symmetric mold on the other circulating chain of the machine, constitutes a cylindrical mold cavity for operating upon the tube. It is common in this art to call each such mold a "mold half". The internal corrugation of the mold, or mold half 18, is indicated by the broken line 20. It is advantageous, however, when the dimensions of all cooperating parts are so chosen, that two neighboring molds, in the operative portion of the path, don't contact one another. This can be attained by a minute clearance between the opposed faces (too small to represent in the drawing). It has appeared that this is one more way of preventing minor vibrations and disturbances to occur or, once created, to propagate to other molds.

At the top, the mold is provided with a nipple 21, with cap nut 22, for connection of a cooling pipe 23 for the interior of the mold. At the bottom similar parts are provided, as indicated by 24, 25, and 26. All the way at the bottom there is a block 41, with which the mold, driven by the chain, is slideable on a special rail, not represented here.

At the top two guide rolls 27, 28 are provided, and at the bottom a similar set of guide rolls 29, 30. The inner rolls of the two sets 27, 29 are situated at substantially the same spacing as the guide faces in the forks of the links 1, 1' and 2, 2'. When the mold is slid from outside into the chain links, roll 27 will thus slide past the parallel faces 7, 8 in the top link 1 while roll 29 will slide past the corresponding faces in the fork opening of the lower link 1'. In the fork openings in the set of links 2, 2' the next mold is arranged in corresponding manner. The correct vertical position is maintained, as will be clear, by the support constituted by the abovementioned block 41.

In the manner described, a shiftability of the mold with respect to the chain links has been introduced, parallel to the direction of the fork faces 7, 8 and 11, 12.

Figure 4:
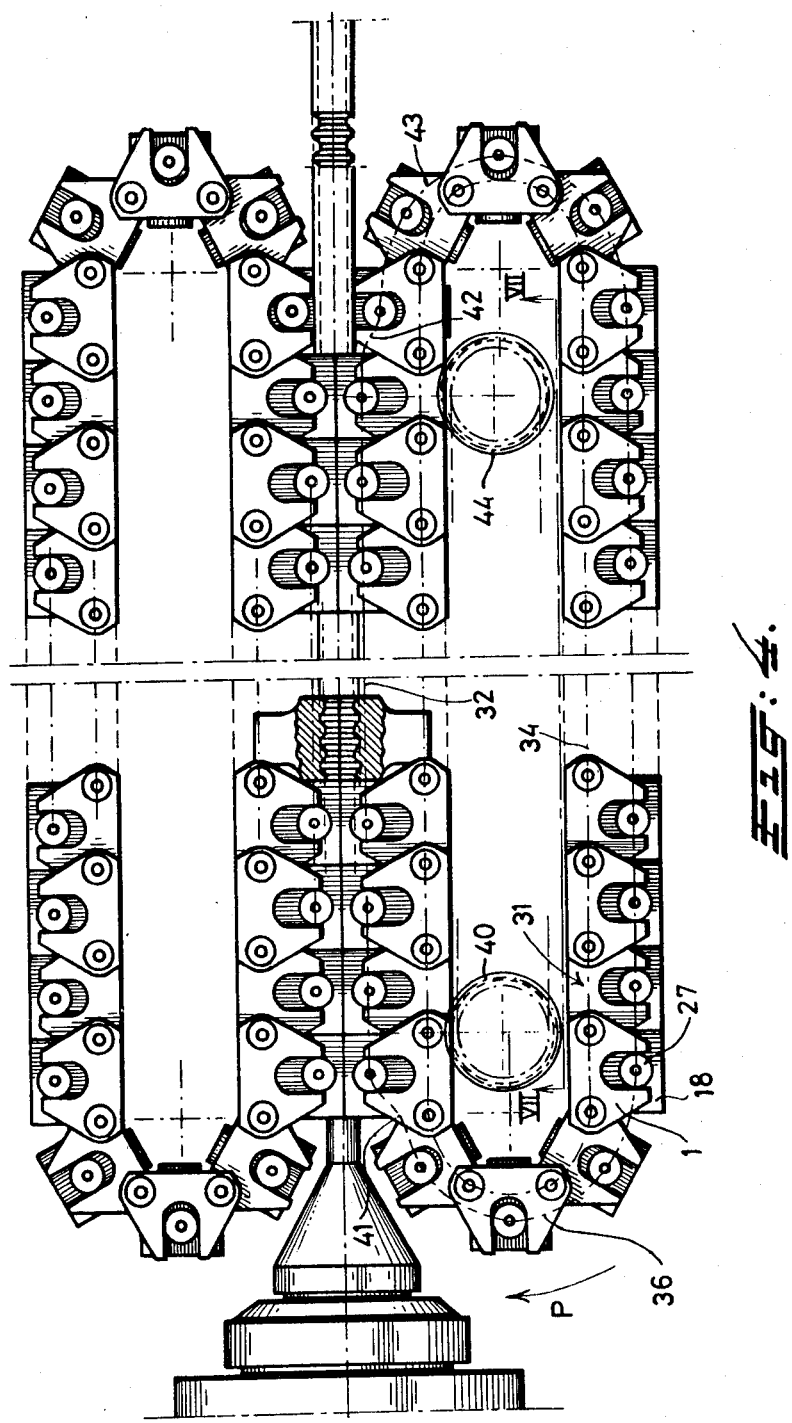
FIG. 4 diagrammatically shows an overall view of the course of the chain with the molds.

The manner in which this shiftability is utilized, is illustrated with reference to FIGS. 4 to 6. FIG. 4 shows the chains with the molds, the path followed by the molds being indicated by the dot-and-dash line 31. For the sake of clarity there has been illustrated separately, and diagrammatically, in FIGS. 5 and 6 how the guides for the molds and for the chain are arranged. In these figures the directions of movement of the chains are indicated by arrows P.

In the straight portion 32 of the path 31, where operation is effected, the guide 33 (see FIG. 5) for the molds is provided at the inside. In practice, this guide can be realized in the same manner as is known in this art, to wit as a rail fixedly arranged on the machine frame.

In the other straight portion 34 a similar rail 35 is provided, also at the inside of the loop. In the curved portion 36 of the path an also curved guide 37 is provided, but in this case at the outside of the loop.

These guides 33, 35, 37 cooperate with the guide rolls 28, 30 on the molds, as described with reference to FIG. 3. It will therefore be apparent that in practice the guides will be realized as double rails, arranged at the appropriate height with respect to these rolls.

At the end—considered in the direction of movement P—guide 37 is provided with a transitional portion 39, The mold is forced to perform a lateral displacement in a direction perpendicular to the path 31, so that the mold cavities will close around the tube, by the appropriate place and shape of the transitional portion 38 with respect to the beginning point 39 of the straight guide 33.

With the transitional portion 38 in the guide a transitional portion 41 corresponds in the path 31 which the molds follow. This portion 41 smoothly joins the reversing path portion. 36. One may also say that the line, representing the course of the transitional portion 40, tangentially joins the curved line of the reversing path 36. Line 40 may be described as a mathematical curve having a bending point. Such curves are, for example, third degree curves $y=ax^3$ or $y=b(x - \sin x)$. Preferably, the bending points will coincide with the end of the reversing movement, because in that case the molding cavity will precisely close at the end of the pivotal movement of the molds. In this way the construction length will become minimum. On the other hand the transitional portion 40 of the path will tangentially join the straight part portion 32.

In order to realize this forced control of the mold with the path illustrated, it is necessary to see to an appropriate chain guide. Such chain guide in the curved path portion 36 is diagrammatically indicated in FIG. 6 by 42. As a matter of course, such guide will be located at the inside of the bend. The guide cooperates with the guide rolls 14, 14', 15, 15' as described with reference to FIG. 2. In the straight portions the chain will not need any guide; it is sufficient that the molds are urged so as to close around the tube.

Figure 5:
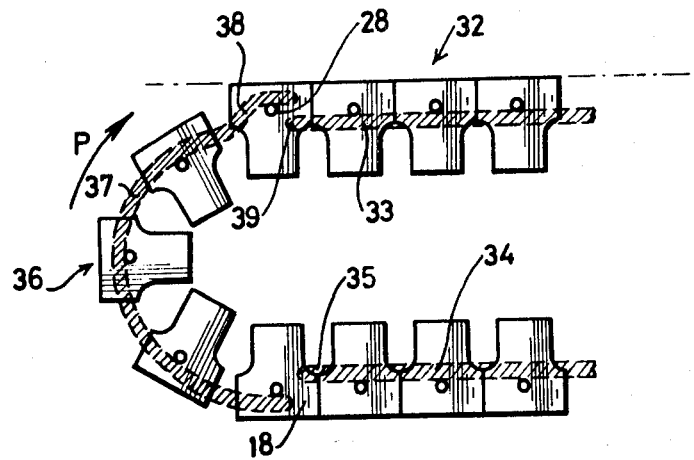
FIG. 5 diagrammatically shows the guides for the molds.
Figure 6:
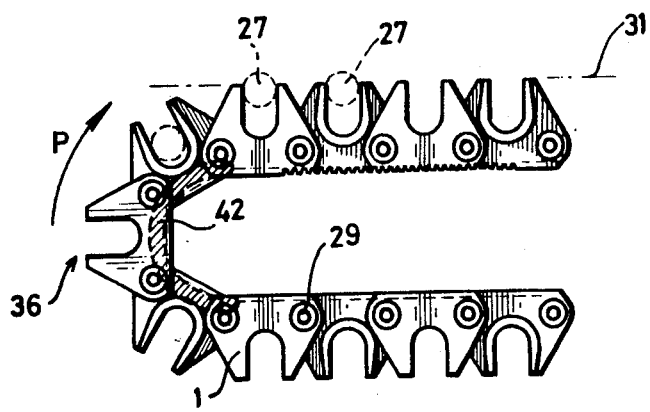
FIG. 6 diagrammatically shows in similar manner the guide for the chain.

At the exit end, which is represented in FIG. 4, but not in FIGS. 5 and 6, the guides are substantially identical. First, there is, however, contiguous with the straight path portion 32, where the molds are still closed, a curvature 42, such that the molds will part laterally with respect to one another whilst the chain still goes straight on, so that the mold is forced to disengage the corrugations of the tube, Not until the corrugations have been disengaged, will the mold start to pivot in the curved, reversing portion of the loop. Also here the transitional 42 to the curved portion 43 of the path has been designed such that mass forces are restricted to a minimum.

Furthermore, in order to keep the cylindrical cavity, which is constituted by two neighboring mold halves, in the straight portion 32 of the path in which the tube is being shaped, completely closed, and to keep the molds free of vibrations and disturbances, the invention proposes to make the chain drive occur at very short distance from the entrance end of the straight path, and to provide for a braking action which is effective near the output end of the straight portion. The drive wheels, such as 40, for each of the closed chains, which move the molds, are therefore situated at this starting point, that is the drive wheel 40, as visible in FIG. 4, effectively drives the mold which is one mold of the first set of molds that has reached the straight path portion 32. In order to make the proposal of this invention effective, said drive wheels may not be situated for example, at the location of the second or third set of molds which, considered from the entrance end, are lying one against the other and constitute the closed cylindrical case, because one or two sets of molds would then be excluded from being effectively kept free of disturbances.

With similar considerations another set of drive wheels such as 44 is arranged close to the output end of the straight portion of the path, because in accordance with the preferred embodiment of the system which is being described, braking means are applied which cooperate with the drive. The location of the wheel 44 represented in FIG. 4, will anyhow determine the location of braking means present, also when these means would be realizes different from the combination with the drive, now to be described, which has the feature that there is no energy consumption for obtaining the braking action.

Figure 7:
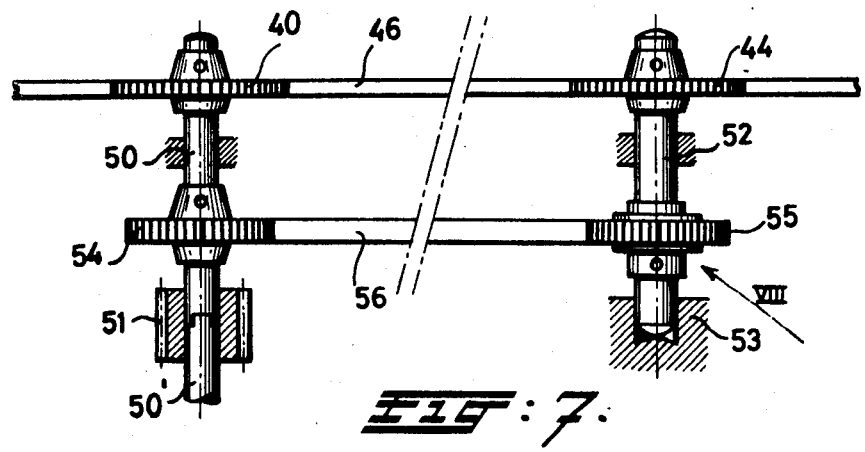
FIG. 7 shows an embodiment of the driving and braking means applied in this apparatus, as seen according to the arrows VII—VII of FIG. 4.

In FIG. 7, the chain, running over two drive wheels 9, has been diagrammatically illustrated, with such simplification as will be allowed in connection with explaining the present feature.

The chain wheel 40 at the start of the straight path, has a positive drive. This is indicated diagrammatically in FIG. 7 in that wheel 40 is fixedly arranged on a spindle 50, bearing as at 51 in the machine frame and extending downwardly, as indicated by 50', so as to be coupled there with a drive, known per se and not illustrated here.

The other wheel 44 is also fixedly mounted on a spindle 52 which, at 53, is idly rotatable in the machine frame. Wheel 44 will therefore be taken along in rotation because the chain passes over the two wheels 40 and 44.

Figure 9:
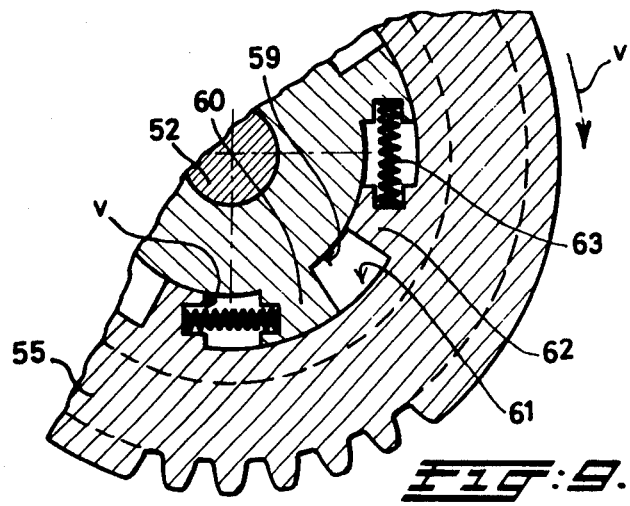
FIG. 9 is a partial cross-sectional view according to the arrows IX—IX of FIG. 8.

On spindle 50 of drive wheel 40 an auxiliary toothed wheel 54 is arranged; it is fixed on spindle 50. At the same height on spindle 52 a second auxiliary toothed wheel 55 is provided; the details of the connection between the said second auxiliary wheel 55 and spindle 52 will be described with reference to FIGS. 8 and 9. Auxiliary toothed wheels 54 and 55 need not have the same diameters as the main toothed wheels 40 and 44. Strictly speaking it is not even necessary that the toothed wheels 40 and 44 are of equal size. Ultimately, as will yet be clarified, the only requirement is that the ratio of the diameter of 54 and the diameter of 40 is the same as the ratio of the diameter of 55 and the diameter of 44, so that the speed of displacement of a chain 56 which is passed over the auxiliary wheels 54 and 55 equals the speed of the main chain 46.

Auxiliary wheel 55 is movable relative to a hub 57 which, in itself, is fixedly arranged on spindle 52. To this end the hub is provided with a short radial flange 58. Said flange 58 along its circumference is provided with a plurality of recesses, such as 59, between which parts of material such as 60 remain. Wheel 55 along the inside of its circumference, is provided with similar recesses, such as 61, between which parts of material such as 62 remain. These recesses and projecting parts are interengaged, in the way represented in FIG. 9, such that room remains for sets of compression springs, such as 63, which have for consequence that there is a force, indicated by V, continuously acting upon disk 55 in circumferential direction, relative to hub 57, which therefore causes a momentum. Because hub 57 and main toothed wheel 44 are both fixed with respect to spindle 52, this momentum is also continuously active between auxiliary toothed wheel 55 and main toothed wheel 44. The precise value thereof which is desired may be adjusted at will at the moment of passing chains 46 and 56 over the toothed wheels. The final result of this is, that continuously a tension will prevail in the auxiliary chain 56, and this will imply a decrease, of equal magnitude, of the tension in the portion of the main chain between wheel 40 and 44. Thereby any play between the individual links of the chain will disappear. Because the whole series of sets of mold halves in the straight portion of the path, from the beginning, will be continuously driven in the direction of the output end, all these mold halves will remain lying very accurately one against the other, so that the hollow molding shape, which is to operate upon the tube, is determined, with great precision, and is maintained over the entire portion which is of importance.

Figure 8:
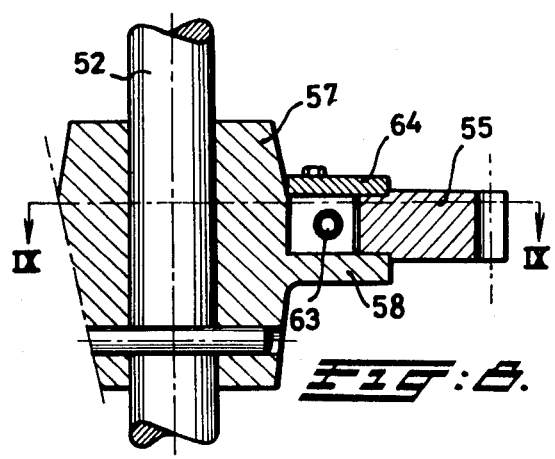
FIG. 8 shows in an enlarged scale a detail indicated by VIII in FIG. 7.

As appears from FIG. 8, the location where auxiliary wheel 55 engages the flange 58 of the hub, and in which the recesses with the springs are provided, may be covered by a flat ring 64.

In the above, reference was made to a chain; a toothed belt is the equivalent thereof in connection with the present invention.

What is claimed is:

1. An apparatus for making a profiled tube by means of an extruder, said apparatus comprising two opposite endless chains, provided with driving means and circulating in horizontal planes, each chain making a plurality of molds or mold halves (18) moving along with the tube (2) produced by and coming from the extruder these molds or mold halves together constituting, in a rectilinear portion (32) of the paths (31) of said chains, a mold cavity in which the tube is being given its profile, wherein the chain comprises a plurality of links (1,2) interconnected by pivot pins (3), the driving means acting upon the links of the chain, each molds or mold halves (18) being supported by one link as to be movable relative to the associated links (1,2) in a direction perpendicular to the lengthwise direction of the chain or, in operation to the direction of movement (P) of the links, the machine frame being provided with guides (33, 35, 37) for the molds or mold halves, of which at least one straight guide (33) in the operative rectilinear portion (32) of the path, is located interiorly with respect to each chain loop and at least one curved guide (37) in each of the curved portions (36, 43) of each chain loop is located exteriorly with respect to the loop.

2. An apparatus according to claim 1, wherein the chain links (1,2) are fork-shaped and the molds (18) are provided with guide rolls (27, 29) cooperating with parallel inner faces (7, 8; 11, 12) of the forks, and are provided with guide rolls (28, 30) cooperating with the guides (33, 35, 37) for the molds.

3. An apparatus according to claim 2, wherein the chain links are double links, (1, 1', 2, 2') and the molds are provided with guide rolls (27, 29) on two corresponding levels for cooperation with the fork faces in each of the links.

4. An apparatus according to claim 1, wherein the molds, at their bottoms, are each provided with a support block (41) with which, during the movement, they rest upon a rail mounted in the machine frame.

5. An apparatus according to claim 1, wherein the guides (37) for the molds, at the entrance and the exit end, at least at the location of a transition (38, 42) to the operative portion (32) of the path, are situated more outwardly than those portions of the guides which lie at greater distance from said operative portion of the path.

6. An apparatus according to claim 5, wherein the transitions at the entrance and the exit ends of the path (31) are bending points of mathematically calculated paths and the operative straight path tangentially joins said transitional portions (41, 42).

7. An apparatus according to claim 1, wherein the chain links are provided with guide rolls (14, 14') cooperating with guides (40) which determine the path of the chain.

8. An apparatus according to claim 1, wherein the chain links (1, 2), the mold halves (10) and the guides (33, 35, 37, 40) are so dimensioned that in the operative rectilinear portion (32) of the chain path (31) neighboring molds have a minute clearance.

9. An apparatus according to claim 1, in which the chains (46) are each provided with driving means (40) which are operative near the entrance end of the said operative rectilinear or straight portion (32) of the path, and braking means (44, 59–63) which are operative near the exit end thereof.

10. An apparatus according to claim 9, wherein the braking means comprise sets of auxiliary toothed wheels (54, 55) one (54) of which is mounted on a spindle of a driven toothed wheel at the entrance end, the other one (55) being an idle guiding wheel for the drive chain near the exit end, the former auxiliary wheel (54) being fixedly mounted relative to the main drive wheel (40) and the lattermentioned auxiliary wheel (55) being rotatable over a certain angular distance relative to the associated main wheel (44), there being provided sets of springs (63) inbetween the two (44, 55) and a chain (56) being passed over the set of auxiliary toothed wheels (54, 55).

11. An apparatus for making profiled plastic tube by means of an extruder, said apparatus comprising two opposite circulating chains, each making a plurality of molds or mold halves (18) move along with the tube (2) produced by and coming from the extruder, these molds or mold halves together constituting, in a rectangular portion (32) of the paths (31) of said chains, a mold cavity in which the tube is being given its profile, wherein the molds (18) are arranged movably relative to the chain links (1,2) in a direction perpendicular to the direction of movement (P) of the links, the machine frame being provided with guides (33, 35, 37) for the molds, of which at least a guide (33) in the operative rectilinear portion (32) of the path, is located interiorly with respect to the chain loop and guides (37) in the curved portions (36, 43) of the path are located exteriorly with respect to the loop, said guides (37) for the molds, at the entrance and the exit end, at least at the location of a transition (38,42) to the operative portion (32) of the path, being situated more outwardly than those portions of the guides which lie at a greater distance from said operative portion of the path, said transitions at the entrance and the exit ends of the path (31) being bending points of mathematically calculated paths and the operative straight path tangentially joins said transitional portions (41,42), and braking means comprising sets of auxiliary toothed wheels (54,55) one (54) of which is mounted on a spindle of a driven toothed wheel at the entrance end, the other one (55) being an idle guiding wheel for the drive chain near the exit end, said auxiliary wheel (54) being fixedly mounted relative to the main drive wheel (40) and one of said auxiliary wheels (55) being rotatable over a certain angular distance relative to said main wheel (44), there being provided sets of springs (63) inbetween the two (44, 55) and a chain (56) being passed over the set of auxiliary toothed wheels (54, 55).

* * * * *